US011639723B2

(12) United States Patent
Landi et al.

(10) Patent No.: US 11,639,723 B2
(45) Date of Patent: May 2, 2023

(54) ARRANGEMENT FOR PRESSURIZING OF FLUID

(71) Applicant: VETCO GRAY SCANDINAVIA AS, Sandvika (NO)

(72) Inventors: Giacomo Landi, Oslo (NO); Vittorio Michelassi, Florence (IT); Matteo Dozzini, Florence (IT); Francesco Cangioli, Florence (IT); Massimiliano Borghetti, Florence (IT)

(73) Assignee: VETCO GRAY SCANDINAVIA AS, Sandvika (NO)

( * ) Notice: Subject to any disclaimer, the term of this patent is extended or adjusted under 35 U.S.C. 154(b) by 828 days.

(21) Appl. No.: 16/334,933

(22) PCT Filed: Sep. 12, 2017

(86) PCT No.: PCT/EP2017/072891
§ 371 (c)(1),
(2) Date: Mar. 20, 2019

(87) PCT Pub. No.: WO2018/054722
PCT Pub. Date: Mar. 29, 2018

(65) Prior Publication Data
US 2020/0018317 A1    Jan. 16, 2020

(30) Foreign Application Priority Data

Sep. 20, 2016    (NO) .................................... 20161502
Aug. 17, 2017    (NO) .................................... 20171365

(51) Int. Cl.
*F04D 19/02*    (2006.01)
*F04D 25/02*    (2006.01)
(Continued)

(52) U.S. Cl.
CPC .......... *F04D 19/022* (2013.01); *F04D 13/06* (2013.01); *F04D 19/024* (2013.01);
(Continued)

(58) Field of Classification Search
CPC .......... F04D 19/024; F04D 3/00; F04D 13/06; F04D 17/12; F04D 19/026; F04D 1/06;
(Continued)

(56) References Cited

U.S. PATENT DOCUMENTS 2,384,000 A    9/1945    Wattendorf
2,451,944 A    10/1948    Stanley
(Continued)

FOREIGN PATENT DOCUMENTS

EP    2824330 A1    1/2015
RU    2458253 C1    8/2012
WO    2015114136 A1    8/2015

OTHER PUBLICATIONS

Preliminary Office Action received for Application No. BR112019005406-5, dated Nov. 3, 2021, 7 pages.

*Primary Examiner* — Dominick L Plakkoottam
(74) *Attorney, Agent, or Firm* — Mintz Levin Cohn Ferris Glovsky and Popeo, P.C.

(57) ABSTRACT

A compressor or pump stage is provided. The compressor or pump stage at least comprising a central shaft (8) and one rotor (3), where the axis of rotation of the rotor (3) is the central shaft (8) and where the rotor comprises a number, n, of rows of impellers (5) arranged at an outer perimeter of the rotor with an axial distance between neighbouring rows of impellers (5), where n={2, 3, 4 . . . }.

8 Claims, 6 Drawing Sheets

(51) Int. Cl.
*F04D 13/06* (2006.01)
*H02K 3/46* (2006.01)
*H02K 7/14* (2006.01)
*F04D 29/58* (2006.01)
*F04D 25/06* (2006.01)
*H02K 21/22* (2006.01)
*H02K 21/14* (2006.01)
*H02K 1/12* (2006.01)
*H02K 1/22* (2006.01)
*H02K 16/00* (2006.01)
*H02K 1/16* (2006.01)

(52) U.S. Cl.
CPC ............ *F04D 19/026* (2013.01); *F04D 25/02* (2013.01); *F04D 25/0606* (2013.01); *F04D 29/588* (2013.01); *H02K 1/12* (2013.01); *H02K 1/16* (2013.01); *H02K 1/22* (2013.01); *H02K 3/46* (2013.01); *H02K 7/14* (2013.01); *H02K 16/00* (2013.01); *H02K 21/14* (2013.01); *H02K 21/22* (2013.01)

(58) Field of Classification Search
CPC .... F04D 25/02; F04D 25/0606; F04D 29/181; F04D 13/12; F04D 17/025; F04D 19/02; F04D 19/022; F04D 29/041; F04D 29/046; F04D 29/051; F04D 29/056; F04D 29/22; F04D 29/42; F04D 29/52
See application file for complete search history.

(56) References Cited

U.S. PATENT DOCUMENTS

| | | | | |
|---|---|---|---|---|
| 2,461,931 | A * | 2/1949 | Smith | F04D 25/02 415/181 |
| 2,831,627 | A * | 4/1958 | Brunner | F04D 25/02 415/150 |
| 4,830,584 | A * | 5/1989 | Mohn | F04D 31/00 417/430 |
| 9,551,349 | B2 * | 1/2017 | Tecza | F04D 17/12 |
| 9,644,633 | B2 * | 5/2017 | Laboube | F04D 29/058 |
| 9,657,744 | B2 * | 5/2017 | Gilarranz | F04D 29/056 |
| 10,294,949 | B2 * | 5/2019 | Bergamini | F04D 19/02 |
| 2018/0017073 | A1 * | 1/2018 | Yamada | F04D 29/422 |
| 2019/0145415 | A1 * | 5/2019 | Brunvold | F04D 29/046 417/423.12 |

* cited by examiner

ARRANGEMENT FOR PRESSURIZING OF FLUID

TECHNICAL FIELD

The present invention relates to a device for increasing the pressure in a fluid, such as a compressor or pump.

BACKGROUND ART

Compressors or pumps are widely used to increase pressure in a fluid.

There is a constant development in the field and there is in general a desire to improve quality and efficiency of compressors and pumps. The present invention aims to present a solution for compressors, pumps or the like. In the interface between the rotational and static parts there can be a problem of windage losses or decreased available power for pressure increase.

The solution aims to reduce windage losses and it's also an object to improve the operating conditions of the proposed solution compared to prior art.

DISCLOSURE OF THE INVENTION

The proposed solution with a modular concept provides the flexibility to adapt to process modifications during the engineering phase and during the pump operation. This is achieved by adjusting the operating speed of the independent modules.

With the proposed solution it is possible to increase the flexibility in design of compressors or pumps, to adapt the device to each customer's need.

According to the present invention it is provided a compressor or pump stage at least comprising a central shaft and one rotor, where the axis of rotation of the rotor is the central shaft and where the rotor comprises a number, n, of rows of impellers arranged at an outer perimeter of the rotor with an axial distance between neighbouring rows of impellers, where n={2, 3, 4 . . . }. In one aspect of the invention the compressor or pump stage can have at least one motor winding and laminations arranged in the central shaft.

In another aspect the compressor or pump stage can further comprise an outer shroud surrounding the rotor, where the outer shroud at least comprises, m, rows of diffusors arranged on the inner diameter of the shroud, where m=n−1. The m diffusors can be arranged to protrude from the inner perimeter of the shroud and expand in between neighbouring rows of impellers.

In yet another aspect of the compressor or pump stage at least two bearings can be arranged between the rotor and the central shaft.

In yet another aspect of the compressor or pump stage at least two axial thrust bearings can be arranged axially remote from each other and being associated with the rotor.

In yet another aspect of the compressor or pump stage a permanent magnet can be arranged on the rotor in close proximity with the central shaft with magnetic interaction with the motor windings defining a gap d1 between the permanent magnet and the motor windings.

In yet another aspect of the compressor or pump stage the permanent magnet can be arranged on the inner diameter of the rotor.

In yet another aspect of the compressor or pump stage a stator and a rotor together forms an electric motor, where the stator can comprise:

a) at least one central shaft with motor winding and laminations;
b) electric wiring for the motor windings, and
c) cooling means and where the rotor with an axis of rotation about the central shaft, at least comprises:

d) a number, n, of rows of impellers arranged at an outer perimeter of the rotor, where n={2, 3, 4 . . . } with an axial distance between the neighbouring rows of impellers;
e) a permanent magnet arranged on the rotor in close proximity with the central shaft and in magnetic interaction with the motor windings defining a gap d1 between the permanent magnet and the motor windings, and where the compressor or pump stage further comprises two or more bearings arranged between the rotor and the axle and at least two axial thrust bearings are arranged axially remote from each other and being associated with the rotor thereby providing a compressor or pump stage.

In another embodiment the invention provides a compressor or pump arrangement comprising a number $l_1, l_2, l_3, l_4, \ldots l_t$ of compressor or pump stages arranged axially adjacent with each other where each stage at least comprises a central shaft and one rotor where the axis of rotation of each rotor is the associated central shaft and where each rotor at least is provided with a number n≥2 rows of impellers arranged at an outer perimeter of its associated rotor with an axial distance between neighbouring rows of impellers.

In an aspect of the compressor or pump arrangement at least a first motor winding and first laminations can be arranged in a first central shaft in a first stage and a second motor winding and second laminations are arranged in a second central shaft in a second stage $l_2$ and optionally a third motor winding and third laminations are arranged in a third central shaft in a third stage $l_3$ and optionally a fourth motor winding and fourth laminations are arranged in a fourth central shaft in a third stage $l_3$.

In yet another aspect of the compressor or pump arrangement the arrangement can comprise a stator and a rotor which together forms an electric motor, where the stator at least comprises:

a) at least one central shaft with motor winding and laminations;
b) electric wiring for the motor windings, and
c) cooling means and where the rotor with an axis of rotation about the central shaft, at least comprises:
d) a number, n, of rows of impellers arranged at an outer perimeter of the rotor, where n={2, 3, 4 . . . } with an axial distance between the neighbouring rows of impellers; and
e) a permanent magnet arranged on the rotor in close proximity with the central shaft and in magnetic interaction with the motor windings defining a gap d1 between the permanent magnet and the motor windings.

In yet another aspect of the compressor or pump arrangement the motor further can comprise two or more bearings arranged between the rotor and the central shaft and at least two axial thrust bearings arranged axially remote from each other and being associated with the rotor.

In yet another aspect of the compressor or pump arrangement each of the compressor or pump stages can comprise a motor and an outer shroud surrounding the rotor, where the outer shroud comprises at least, m, rows of diffusors arranged on the inner diameter of the outer shroud, where m=n−1, and where the m diffusors are arranged to protrude from the inner perimeter of the outer shroud and expand in between neighbouring rows of impellers thereby providing a compressor or pump stage.

In yet another aspect of the compressor or pump arrangement, the rotors of the compressor or pump stages $l_{(t=2*k+1)}$ can rotate in one direction and rotors of the compressor or pump stages $l_{(t=2*j)}$ can rotate in an opposite direction, where k={0, 1, 2 . . . } and j={1, 2, 3 . . . }.

In yet another aspect of the compressor or pump arrangement, all rotors of the compressor or pump stages can rotate in the same direction.

In yet another aspect of the compressor or pump arrangement each of the compressor or pump stages can comprise a motor and an outer shroud surrounding the rotor, where the outer shroud comprises rows of diffusors arranged on the inner diameter of the outer shroud, where the diffusors are arranged to protrude from the inner perimeter of the outer shroud and expand in between neighbouring rows of impellers and where a row of diffusors is arranged between each compressor or pump stage.

In yet another aspect of the compressor or pump arrangement the arrangement can comprise a number of compressor or pump stages arranged radially adjacent with each other
  a) where a first inner stage at least comprises a first inner central shaft and one first inner rotor where the axis of rotation of the first inner rotor is the first inner central shaft,
  b) a second outboard stage arranged radially outside of the first inner stage comprising a second outer rotor and where the axis of rotation of the second outer rotor is the first inner central shaft, and
  c) optionally a third outboard stage arranged radially outside of the second outer stage comprising a third outer rotor and where the axis of rotation of the third outer rotor is the first inner central shaft and where each rotor at least is provided with a number rows of impellers arranged at an outer perimeter of its associated rotor with an axial distance between neighbouring rows of impellers.

In yet another aspect of the compressor or pump arrangement at least a first motor winding and first laminations can be arranged in a first central shaft in a first inner stage, and a second outer motor winding and second outer laminations are arranged in the second outer rotor and optionally a third outer motor winding and third outer laminations are arranged in the third outer rotor.

In yet another aspect of the compressor or pump arrangement, each compressor or pump stage at least comprises a stator and a rotor which together forms an electric motor,
  a) where a first inner stator being a part of a first inner motor at least comprises:
    i. at least one central shaft with motor winding and laminations;
    ii. electric wiring for the motor windings, and
    iii. cooling means
  and where a first inner rotor with an axis of rotation about the central shaft being a part of a first inner motor, at least comprises:
    iv. a number, n, of rows of impellers arranged at an outer perimeter of the rotor, where n={2, 3, 4 . . . } with an axial distance between the neighbouring rows of impellers; and
    v. a permanent magnet arranged on the rotor in close proximity with the central shaft and in magnetic interaction with the motor windings defining a gap d1 between the permanent magnet and the motor windings, and
  b) where a second outer stator radially outside of a second outer rotor being a part of a second outer motor comprises:
    vi. second outer motor winding and second outer laminations;
    vii. second outer electric wiring for the second outer motor windings, and
    viii. second outer cooling means
  and where the second outer rotor with an axis of rotation about the central shaft being a part of a second outer motor, at least comprises:
    ix. a number, n, of rows of impellers arranged at an outer perimeter of the second outer rotor, where n={1, 2, 3 . . . } and if n≥2 with an axial distance between the neighbouring rows of impellers; and
    x. a permanent second outer magnet arranged on the outer rotor in close proximity with the second outer stator and in magnetic interaction with the second outer motor windings defining a gap d1 between the second outer permanent magnet and the second outer motor windings.

In yet another aspect of the compressor or pump arrangement the first inner motor further can comprise two or more bearings arranged between the first inner rotor and the central shaft and at least two first inner axial thrust bearings arranged axially remote from each other and being associated with the first inner rotor and the second outer motor further comprises at least one bearings arranged between the second outer rotor and an annular bearing raceway where the annular bearing raceway is arranged axially adjacent with the first inner stator.

In yet another aspect of the compressor or pump arrangement each of the compressor or pump stages comprises at least, m, rows of diffusors arranged between the second outer stator and the first inner stator.

In yet another aspect of the compressor or pump arrangement, the first inner rotors of the compressor or pump stages can rotate in one direction and the second outer rotors of the compressor or pump stages can rotate in an opposite direction.

In yet another aspect of the compressor or pump arrangement, the second outer compressor or pump stage comprises a second outer shroud surrounding the second outer stator.

In another embodiment the invention provides a multidimensional scalable compressor and pump system at least comprising:
  a) a number $l_1, l_2, l_3, l_4, \ldots l_t$ of compressor or pump stages arranged axially adjacent with each other where each stage at least comprises a central shaft and one rotor where the axis of rotation of each rotor (3) is the associated central shaft;
  b) a number of compressor or pump stages arranged radially adjacent with each other
    i. where a first inner stage at least comprises a first inner central shaft and one first inner rotor where the axis of rotation of the first inner rotor is the first inner central shaft,
    ii. a second outboard stage arranged radially outside of the first inner stage comprising a second outer rotor and where the axis of rotation of the second outer rotor is the first inner central shaft, and
    iii. optionally a third outboard stage arranged radially outside of the second outer stage comprising a third outer rotor and where the axis of rotation of the third outer rotor is the first inner central shaft, and where each rotor at least is provided with one or more rows of impellers with an axial distance between neighbouring rows of impellers.

In one aspect of the invention it is provided a multidimensional scalable compressor and pump system, where the compressor or pump stages can be arranged axially adjacent with each other at least comprise a first motor winding and first laminations arranged in a first central shaft in a first stage $l_1$, and a second motor winding and second laminations arranged in a second central shaft in a second stage $l_2$ and optionally a third motor winding and third laminations arranged in a third central shaft in a third stage $l_3$.

In yet an aspect of the present invention the multidimensional scalable compressor and pump system the compressor or pump stages can be arranged axially adjacent with each other at least comprises a stator and a rotor which together forms an electric motor, where the stator at least comprises:

a) at least one central shaft with motor winding and laminations;
b) electric wiring for the motor windings, and
c) cooling means and where the rotor with an axis of rotation about the central shaft, at least comprises:

d) a number, n, of rows of impellers arranged at an outer perimeter of the rotor, where n={2, 3, 4 . . . } with an axial distance between the neighbouring rows of impellers; and
e) a permanent magnet arranged on the rotor in close proximity with the central shaft and in magnetic interaction with the motor windings defining a gap d1 between the permanent magnet and the motor windings. Optionally a fourth motor winding and fourth laminations can be arranged in a fourth central shaft in a third stage $l_3$.

In yet another aspect of the multidimensional scalable compressor and pump system at least a first motor winding and first laminations can be arranged in a first central shaft in a first inner stage, and a second outer motor winding and second outer laminations are arranged in the second outer rotor and optionally a third outer motor winding and third outer laminations are arranged in the third outer rotor for the compressor or pump stages arranged radially adjacent with each other.

Other advantageous features will be apparent from the accompanying claims.

BRIEF DESCRIPTION OF DRAWINGS

Following is a brief description of the drawings in order to make the invention more readily understandable, the discussion that follows will refer to the accompanying drawings, in which FIG. 7 shows a sixth embodiment of the according to the present invention.

MODE(S) FOR CARRYING OUT THE INVENTION

In the following it is firstly disclosed general embodiments in accordance to the present invention, thereafter particular exemplary embodiments will be described. Where possible reference will be made to the accompanying drawings and where possible using reference numerals in the drawings. It shall be noted however that the drawings are exemplary embodiments only and other features and embodiments may well be within the scope of the invention as described.

The arrangement according to the invention is suitable for use in a compressor or pump but can be used in any situation where there is a need to increase pressure in a fluid.

The invention provides scalability and increased efficiency per volume and simpler arrangement with respect to wiring and bearings. It is an object to provide a ratio between active sections of the motor vs. passive sections optimal, i.e. reduce amount of sections that do not add to efficiency/power relative to sections that increases efficiency/power.

An optimal ratio between active sections and passive sections for a single pump or compressor module can be achieved by providing two or more rows of impellers per rotor. An arrangement with two or more impellers per rotor means that one will have one rotor which provides approximately the same amount of power as two rotors while maintaining the same amount of passive sections, such as motor winding end turn as for traditional "one impeller row per rotor" arrangements where the number of motor end winding would be double. Two or more impellers per rotor means that the axial length of the rotor can be shorter than for two rotors having the same characteristics. Moreover, each rotor needs radial and axial bearings, reducing the number of rotors thus implies reducing the number of bearings.

A basic compressor or pump module according to the present invention comprises at least a central shaft 8 and one rotor 3, where the axis of rotation of the rotor 3 is the central shaft 8. The rotor comprises a number, n, of rows of impellers 5 associated with the rotor and with an axial distance between neighbouring rows of impellers 5. In principle the number n of rotors can be any natural positive n={1, 2, 3 . . . }. For inboard pump or compressors the central shaft is at least provided with one motor winding 1 and laminations. In outboard configurations an outboard stator is provided with motor windings and laminations. The pump or compressor module can be provided with an outer shroud 12 surrounding the rotor 3, for inboard variants and surrounding an outboard stator for outboard variants. For inboard stators the outer shroud can be provided with m, rows of diffusors arranged on the inner diameter of the shroud 12, where m can be m=n−1, where n is the number of impellers.

In principle the scalability is achieved by providing compressor or pump modules that can be stacked together longitudinally (serially) or radially (in parallel) or in a combination of longitudinally and radially. In stacked configuration each pump or compressor module will be denoted a stage, either an axial stage or a radial stage. A serially stacked configuration provides flexibility with respect to overall power while maintaining a substantially constant diameter. Radial stacking means that it is possible to increase power without adding substantial axial length to a pump or compressor arrangement. Hence, high power vs axial length can be achieved and the power can be increased without adding substantial axial length to a pump or compressor arrangement. Typically outer radial stages will be of the outboard type, whilst the inner radial type can be of the inboard type. A combination of radial and longitudinal stacking can provide high power per volume unit.

It is a challenge with some configurations of modular contra rotating pumps that there is a high windage loss in connection with low power density of the motor, which makes it difficult to operate a pump or compressor in a satisfactory way.

However, with a 1:1 ratio for electric motor and stage, impeller and diffuser, it is possible to decrease the number of feed-trough cables necessary to feed the permanent magnet motor. The stages are coupled to reduce the number of electrical penetrations.

It can be noted that if an electrical motor includes more than one stator then the ratio between active components (stator laminations) and passive components (motor end windings) will provide an increased power per motor length.

With the presented arrangement there is a need for fewer electric motors/stators, less drivers and less bearings per unit length to obtain the same result as with prior art compressors or pumps. The layout of the pump or compressors according to the present invention combines the possibility of adjusting the speed of the first stages of the rotating equipment to process variations. The layout provides the ability to quickly adjust the operating conditions, such as speed or torque as independent rotors and stators can be adjusted in speed and also there is a lower mass moment of inertia of each stage as compared with non-modular conventional solution.

Different embodiments of the invention will now be described with reference to the drawings.

First Variant of First Embodiment of the Invention

Figure 1:
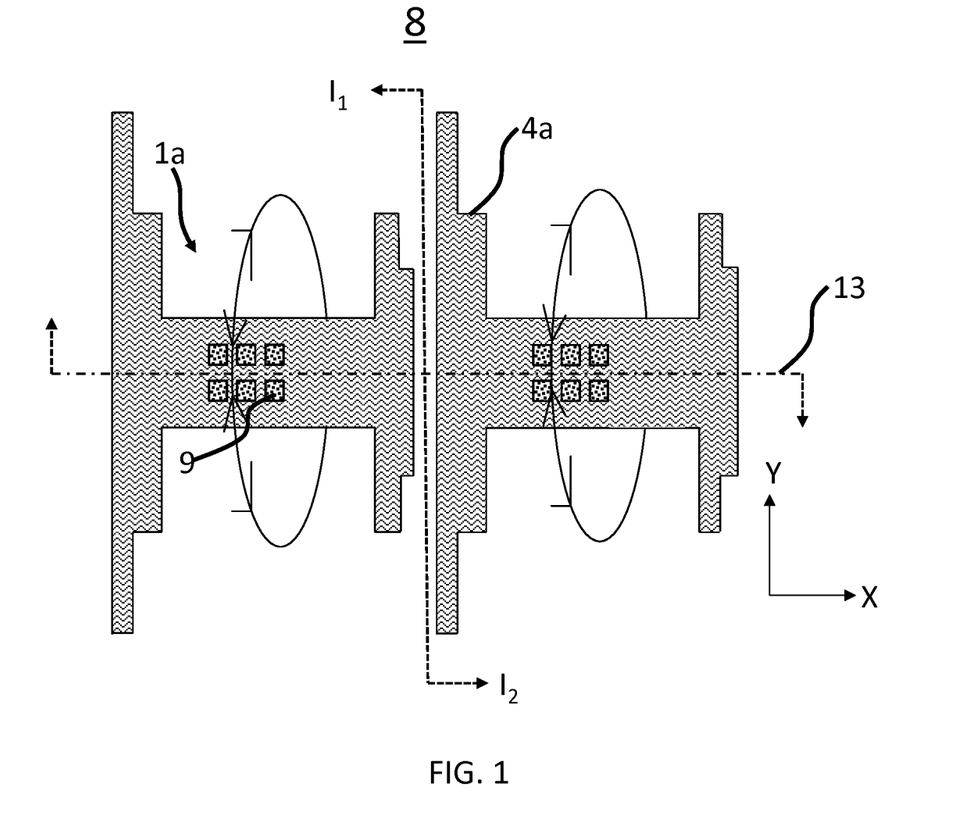
FIG. 1 shows a cross section of a shaft/central shaft of a modular pump.
Figure 2:
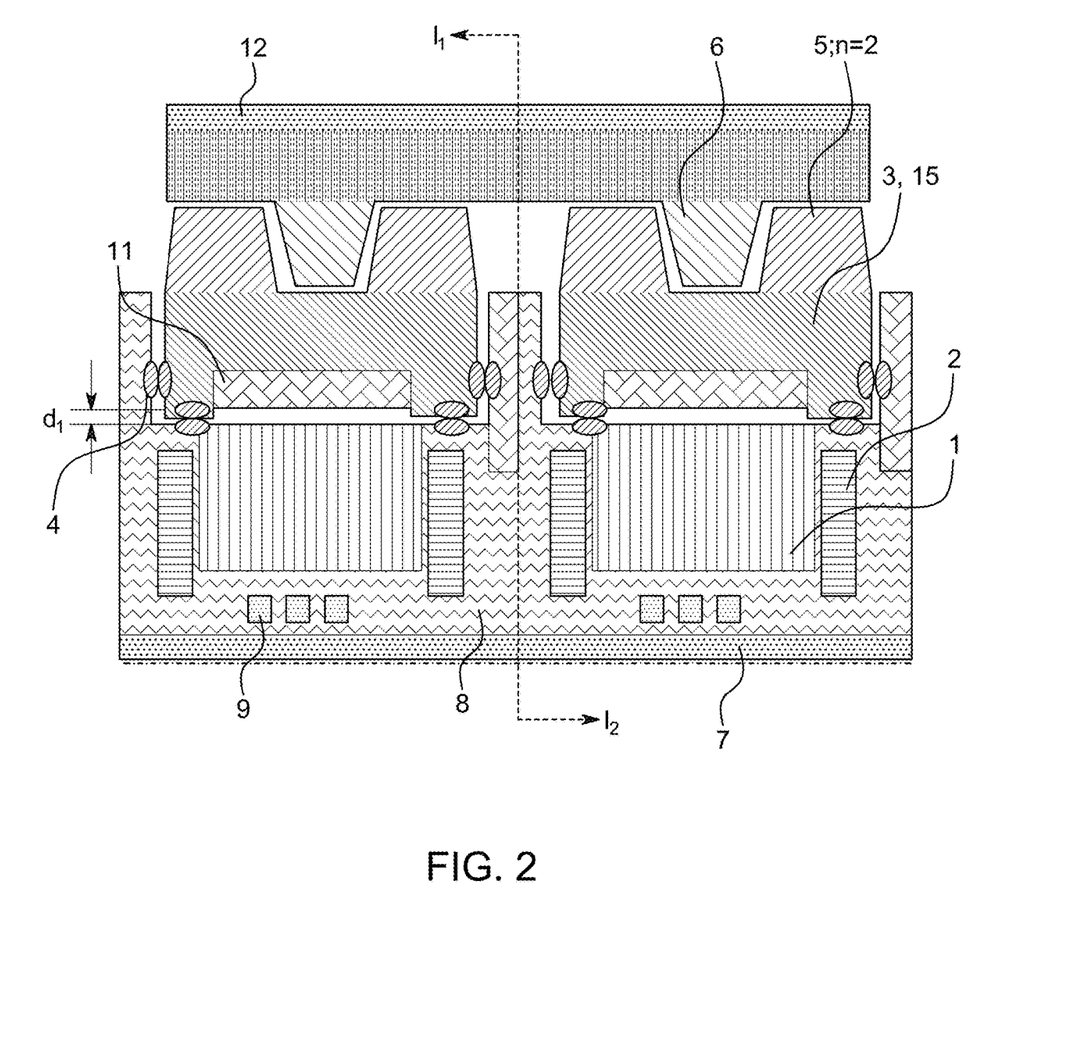
FIG. 2 shows a sectional view showing the basic principles of a modular pump according to one embodiment of the present invention.

The first embodiment of the invention relates to single modules of a pump or compressor of the inboard type. With reference to FIG. 2 it is shown two stages, a first stage and a second stage. The first variant of the first embodiment complies with a single stage shown in the figure. The first variant of the first embodiment comprises two sets/rows of impellers per rotor. The rotor 3 can in principle be described as a disc with two rows of impellers 5 associated with the disc. The rotor is adapted to rotate about a central shaft 8. The central shaft 8 is in this configuration the stator, i.e. fixed. The stator and the rotor 3 together forms an electric motor. The stator at least comprises motor windings 1 and laminations. Electric wiring 2 which provides for a magnetic field is wound around parts of the laminations in the central shaft 8. The wiring 2 shown on each side of the laminations are the same. It can be seen that the first stage in FIG. 2 is provided with cooling means 9. The cooling means can be canals provided in the central shaft 8 for circulation of a cooling fluid.

The rotor 3 with an axis of rotation about the central shaft 8 is shown with two rows of impellers 5 arranged at an outer perimeter of the rotor, with an axial distance d between the two neighbouring rows of impellers 5. A magnet 11 is arranged on the rotor 3 in close proximity with the central shaft 8. Hence the magnet 11 is arranged on the inner diameter of the rotor 5. The magnet is indicated as a permanent magnet, obviously it is possible to use bars in the motor with an asynchronous typology. Hence the rotor can also include laminations. The magnet 11 is in magnetic interaction with the stator. There is a gap d1 between the magnet 11 and the stator with its laminations and motor windings 2.

Bearings are provided between stator and rotor, i.e. between rotating and fixed parts and/or between rotating parts. The compressor or pump stage according to the first variant of the first embodiment comprises two or more radial bearings arranged between the rotor 3 and the central shaft 8 and at least two axial thrust bearings 4 are arranged axially remote from each other and being associated with the rotor 3. It shall be noted that this configuration with two rows of impellers per rotor implies the same bearing configurations as a rotors with single rows of impellers.

In between the two rows of impellers 5 with an axial distance d one row of diffusors 6 can be arranged. The diffusor 6 aims to direct a fluid stream so that it hits the impellers in a correct angle. The row of diffusors 6 can be fixed to an outer casing or shroud 12 and protrude inwards from this outer shroud 12.

There is a gap between the outer diameter of the impellers and the inner diameter of the outer shroud 12. The gap can typically be approximately 1 mm so as to minimise fluid "leakage" between impellers 5 and outer shroud 12.

In the first variant of the first embodiment it is shown one row of diffusors in between the rows of impellers, it can also be added rows of diffusors axially to the left and/or right of the impellers i.e. not between. The motivation can be to direct fluid in an optimal direction towards the first row of impellers or in the case of added exit diffusors the object can be to direct the direction of flow in an optimal direction with respect to trailing equipment.

The power density of a stage according to a first variant of the first embodiment is increased as the arrangement is axially more compact than separate pumps or compressors.

As the motors are placed in the central axis of the pump or compressor according to the first variant of the first embodiment, it is possible to reduce power loss.

Second Variant of First Embodiment of the Invention

Figure 3:
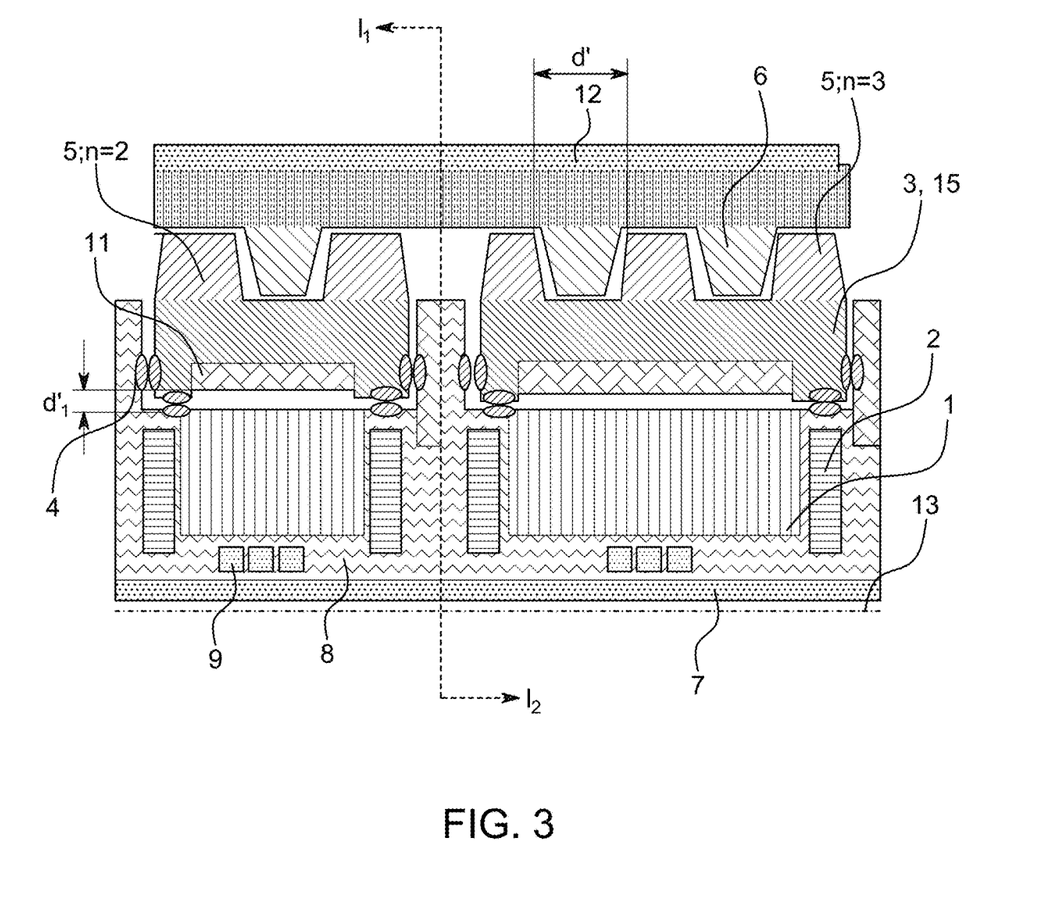
FIG. 3 shows a sectional view of a second embodiment of the modular pump according to the present invention.

Reference is made to second stage of FIG. 3, which discloses a single pump or compressor. This second variant of the first embodiment is distinguished from the first variant in that it includes three rows of impellers 5 per rotor. This is also an inboard pump or compressor type.

Consequently it also includes two rows of diffusors in between the rows of impellers.

The ratio between active and passive components is even better for this second variant of the first embodiment than it is for the first variant of the first embodiment. Moreover the power per volume and axial length is increased as compared with the first variant of first embodiment.

Note that the same bearing arrangement as for the first variant of the first embodiment is necessary.

As for the first variant of the first embodiment the pump or compressor can be supplied with exit and entrance rows of diffusors.

As the motors are placed in the central axis of the pump or compressor according to the second variant of the first embodiment, it is possible to reduce power loss.

General Variant of First Embodiment of the Invention

The first embodiment of the invention can be extended to include any number of impeller rows per rotor, of course restricted by practical/technical limitations. The general variant will also include an increased number of diffusors, one row between each row of impellers, hence if n rows of impellers are applied n−1 rows of diffusors can be applied.

As for the first and second variant of the first embodiment the pump or compressor can be supplied with exit and entrance rows of diffusors.

First Variant of Second Embodiment of the Invention

Figure 6:
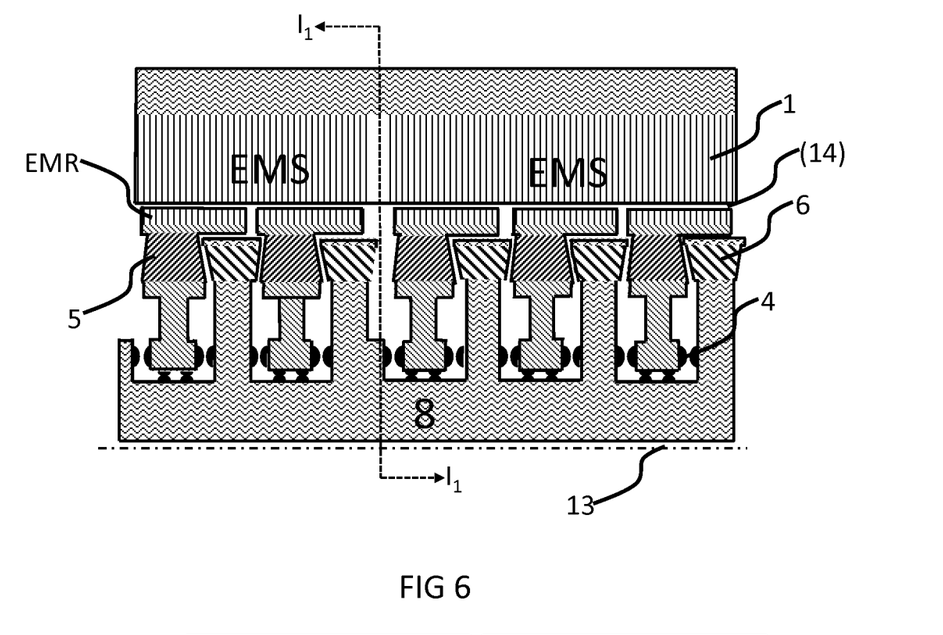
FIG. 6 shows a fifth embodiment of the modular pump according to the present invention suitable for use in compressors or pumps, and modular pump

The second embodiment of the invention relates to single modules of a pump or compressor of the outboard type. With reference to FIG. 6 it is shown two stages, a first stage and a second stage. The first variant of the second embodiment complies with the first stage shown in FIG. 6. The first variant of the second embodiment comprises two sets/rows of impellers per stator (EMS). The two rotors can in principle be described as two discs with rows of impellers associated with the disc. The rotor is adapted to rotate about a central shaft. The central shaft is in this configuration a passive element with diffusors protruding radially outwards from the central shaft.

In between the two rows of impellers with an axial distance one row of diffusors is shown. The row of diffusors aims to direct a fluid stream so that it hits the impellers at a correct angle. In the first variant of the second embodiment it is shown one row of diffusors in between the rows of impellers, it can also be added rows of diffusors axially to the left and/or right of the impellers i.e. not between. The motivation can be to direct fluid in an optimal direction towards the first row of impellers or in the case of added exit diffusors the object can be to direct the direction of flow in an optimal direction with respect to trailing equipment. In the figure it is shown an exit row of diffusors The rotors are provided with magnets, permanent or rotor bars, close to its outer diameter. Outside of the magnets, at an outer diameter of the rotor it is arranged an outer retaining ring which among other shall keep the magnets in place when they are affected by centrifugal forces. There is a gap between the outer diameter of the retaining ring and the inner diameter of an outer—outboard— stator. The gap can typically be approximately 1 mm so as to minimise fluid "leakage" between impellers and the outboard stator.

The stator and the two rotors together forms an electric motor. The stator can comprise motor windings and laminations. Electric wiring which provides for a magnetic field is wound around parts of the laminations of the stator. The wiring is not shown in FIG. 6. The polarity of the electricity decides whether the stator is North Pole or South Pole. In one embodiment AC-current is used and the polarity of the electro magnet will switch accordingly. Three phase AC-current can be fed to the electric wiring. The outboard stator of the pump or compressor according to the first variant of the second embodiment can be provided with cooling means. The cooling means are not shown, however they can be implemented as canals provided in the stator for circulation of a cooling fluid.

Bearings are provided between central shaft and the two rotors, i.e. between rotating and fixed parts and/or between rotating parts. The compressor or pump stage according to the first variant of the second embodiment comprises two or more radial bearings arranged between each rotor and the central shaft and at least two axial thrust bearings are arranged axially remote from each other and being associated with each rotor.

Second Variant of Second Embodiment of the Invention

Reference is made to second stage of FIG. 6, which discloses a single pump or compressor. This second variant of the second embodiment is distinguished from the first variant in that it includes three rows of impellers and hence three rotors. This is also an outboard pump or compressor type. Consequently it also includes two rows of diffusors in between the rows of impellers protruding out from the central shaft. Additional exit and or entrance diffusors can be added in the same manner as described with reference to the first variant of the second embodiment.

The ratio between active and passive components is even better for this second variant of the second embodiment than it is for the first variant of the second embodiment, as only one stator is in magnetically interaction with three rows of impellers. Moreover the power per volume and axial length is increased as compared with the first variant of the second embodiment.

Note that the same bearing arrangement as for the first variant of the second embodiment is necessary.

General Variant of Second Embodiment of the Invention

The second embodiment of the invention can be extended to include any number of impeller rows per rotor, of course restricted by practical/technical limitations. The general variant will also include an increased number of diffusors, one row of diffusors between each row of impellers, hence if n rows of impellers are applied n−1 rows of diffusors can be applied.

As for the first and second variant of the second embodiment the pump or compressor can be supplied with exit and entrance rows of diffusors.

One object of the second embodiment is to drive two or more impellers/rotors by one stator. The impellers are not mechanically coupled but just magnetically coupled. By combining more than one stage the power density of the overall system will be increased because of the increased active lamination length with respect to the overall motor length.

First Variant of Third Embodiment of the Invention

The first variant of the third embodiment of the invention relates to two single modules of a pump or compressor of the inboard type as described above for the first variant of the first embodiment axially stacked together as indicated in FIG. 2. It is shown two stages, a first stage and a second stage each stage with one rotor. Direction of rotation of the stages are shown opposite each other, i.e. coaxially contra rotating. The impellers in each stage can be configured for opposite direction. This can be achieved by reversing the phase of the electric current feeding the electric wirings 2 of the stators. The contra rotating configuration means that diffusors are not necessary between stages and a stream of fluid will enter the second stage first impeller with a direction component adapted for the impeller configuration of the second stage. Also the fluid stream shall be directed in the same direction hence the impellers of the second stage with a different direction of rotation shall have a different twisting angle of the blades.

A configuration where the rotors in each stage rotates in the same direction is possible, however the configuration of the diffusors must be adapted accordingly.

Second Variant of Third Embodiment of the Invention

Reference is made to FIG. 3, which discloses two single pumps or compressors. The first stage complies with the first variant of the first embodiment, whilst the second stage complies with the second variant of the first embodiment. This second variant of the third embodiment is distinguished from the first variant in that it includes different numbers of rows of impellers between the first and the second stage. This is also an inboard pump or compressor type.

General Variant of Third Embodiment of the Invention

The third embodiment of the invention can be extended to include more than two pump or compressor stages stacked axially.

The axially stacked pumps or compressors can be of the first variant first embodiment type, or it can be of the second variant first embodiment type or more generally of the general variant of the first embodiment type. In principle any number of stages can be stacked, only limited by practical and technical reasons.

Obviously direction of exit stream of fluid from one stage must be adapted to the entrance of a trailing stage.

As for the first and second variant of the second embodiment the pump or compressor can be supplied with exit and entrance rows of diffusors.

First Variant of Fourth Embodiment of the Invention

The first variant of the fourth embodiment of the invention relates to two single modules of a pump or compressor of the outboard type as described above for the first variant of the second embodiment axially stacked together as indicated in FIG. 6, note that FIG. 6 second stage shows the second variant of the second embodiment. It is shown two stages, a first stage and a second stage each stage with two rotors. Direction of rotation of the stages can be opposite of each other, i.e. coaxially contra rotating or it can be in the same direction, dependent on the current phase delivered to the electromagnets, EMS of the stators. Dependent on the rotational configuration the diffusors have to be adapted accordingly.

Second Variant of Fourth Embodiment of the Invention

Reference is made to FIG. 6, which discloses two single pumps or compressors. The first stage complies with the first variant of the second embodiment, whilst the second stage complies with the second variant of the second embodiment. This second variant of the fourth embodiment is distinguished from the first variant in that it includes different numbers of rotors between the first and the second stage. This is also an outboard pump or compressor type.

General Variant of Fourth Embodiment of the Invention

The fourth embodiment of the invention can be extended to include more than two pump or compressor stages stacked axially.

The axially stacked pumps or compressors can be of the first variant second embodiment type, or it can be of the second variant second embodiment type or more generally of the general variant of the second embodiment type. In principle any number of stages can be stacked, only limited by practical and technical reasons.

Obviously direction of exit stream of fluid from one stage must be adapted to the entrance of a trailing stage.

As for the first and second variant of the second embodiment the pump or compressor can be supplied with exit and entrance rows of diffusors.

Fifth Embodiment of the Invention

Figure 4:
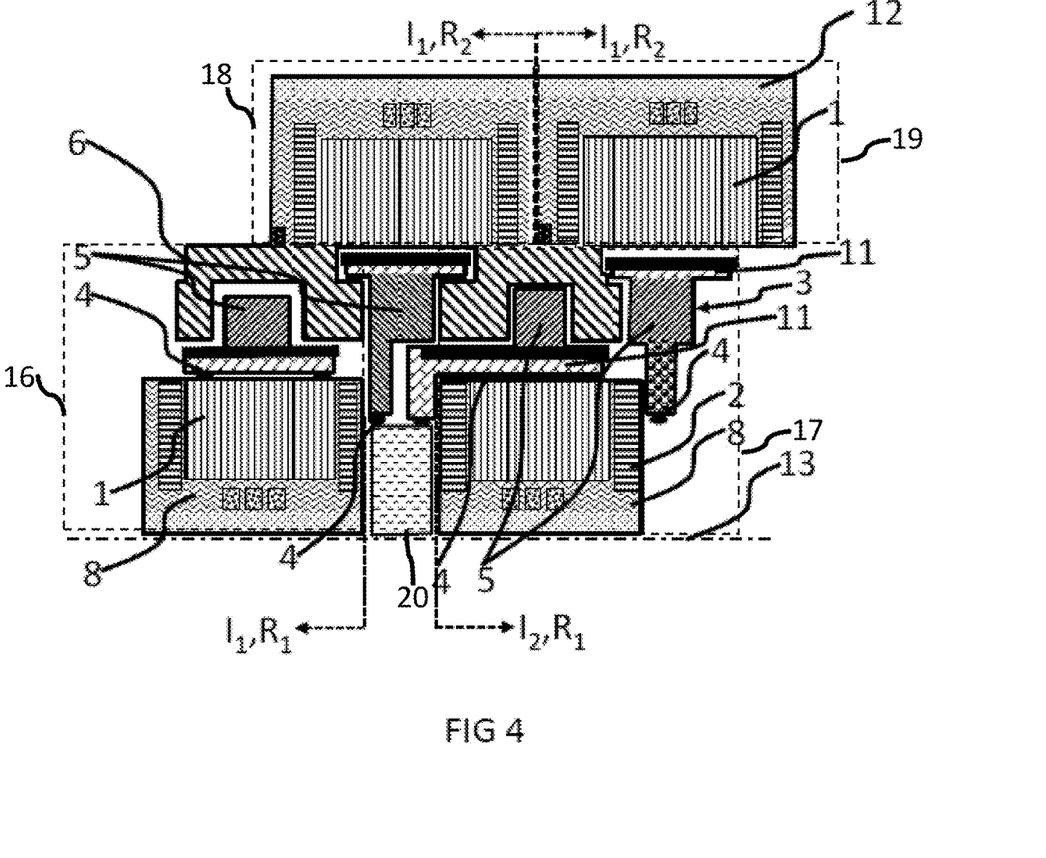
FIG. 4 shows a sectional view of a third embodiment of the modular pump according to the present invention.

Reference is made to FIG. 4. FIG. 4 shows a multistage inboard outboard configuration. The inboard stages includes two stages (16, 17) axially arranged. In between the two axially arranged inboard stages it is provided an annular bearing raceway 20. The annular bearing raceway in the figure represents a portion of the central shaft with an enlarged diameter. The size of the inner diameter of the inner perimeter of a rotor adapted to rotate around a central shaft on said bearing raceway dictates the outer diameter of the annular bearing raceway. In the same manner a second bearing raceway associated with a second rotor associated with a second radial stage second axial stage can be provided on the central shaft. Bearings are provided between stator and rotor, i.e. between rotating and fixed parts and/or between rotating parts. The compressor or pump stage according to the fifth embodiment comprises at least one radial bearings arranged between rotor and the central shaft or the annular bearing raceway and at least two axial thrust bearings arranged axially remote from each other and being associated with the same rotor. It shall be noted that configurations with two or more rows of impellers per rotor implies the same bearing configurations as a rotors with single rows of impellers.

The axis of rotation is the central longitudinal axis of the central shaft.

The multistage inboard outboard configuration can be seen as four stages of pumps or compressors, a first axial inboard stage 16 to the left in the figure and a second axial inboard stage 17 to the right in the figure, both being the stages radially closest to the central shaft. Each stage includes elements as indicated in the first embodiments above.

The rotors of the inboard stages are provided with magnets, permanent or rotor bars, close to its inner diameter. There is a gap between the inner diameter of the magnets and the outer diameter of the central. The gap can typically be approximately 1 mm so as to minimise fluid "leakage" between impellers and the outboard stator.

Further the inboard outboard multistage configuration comprises a first axial stage second radial outboard stage 18 being the pump or compressor stage radially next to the first axial inboard stage. The first axial stage second radial outboard stage comprises a rotor with the central shaft as an axis of rotation. The rotor of the first axial stage second radial outboard stage is provided with bearings between the annular bearing raceway and said rotor.

The rotors of the outboard stages are provided with magnets, permanent or rotor bars, close to its outer diameter. Outside of the magnets, at an outer diameter of the rotor it can be arranged an outer retaining ring which among other shall keep the magnets in place when they are affected by centrifugal forces. There is a gap between the outer diameter of the retaining ring and the inner diameter of an outer— outboard— stator. The gap can typically be approximately 1 mm so as to minimise fluid "leakage" between impellers and the outboard stator.

The rotor of the first axial stage second radial outboard stage rotates according to FIG. 4 in the opposite direction of the first inboard and second inboard axial rotors. A second axial stage second radial outboard stage substantially equal to the first axial stage second radial outboard stage is arranged axially adjacent the first axial stage second radial outboard stage. The configuration with four stages, a first axial inboard stage, a second axial inboard stage, a first axial second radial outboard stage and a second axial stage second radial outboard stage according to FIG. 4 shows that axially neighbouring impellers rotates in the same direction whilst inboard and outboard stages next to each other rotates in the opposite directions.

Diffusors are arranged in between impellers. In the figure seen from left the diffusor—rotor configuration is as follows: diffusor→rotor first axial inboard stage→diffusor-→rotor first axial second radial outboard stage→diffusor-→rotor second axial inboard stage→diffusor→rotor second axial second radial outboard stage. FIG. 4 shows the rotors without any indication of the number of rows of impellers per rotor. Each rotor can hold more than one row of impellers in the same manner as described with reference to previous embodiments.

Optionally additional diffusors arranged in between two neighbouring impellers associated with the same rotor can be added.

The multistage inboard outboard configuration of FIG. 4 according to the fifth embodiment can be repeated serially so that a second and/or third multistage inboard outboard stage 19 can be arranged axially to the left or right.

It can be seen that the first and second axial stage in FIG. 4 is provided with cooling means. The cooling means can be canals provided in the central shaft for circulation of a cooling fluid. Likewise in the outboard stators of the second radial stages it is indicated cooling means, these cooling means can be provided as canals.

Adjacent the outer diameter of the outboard stator it can be provided an outer shroud.

With a combination of inboard motors/stators embedded in the central shaft and outboard motors/stators radially remote from the shaft, it is possible to obtain high efficiency in a limited space and higher power per unit length The direction of rotation for the rotors according to the fifth embodiment can be configured differently from what is indicated in FIG. 4. In principle as the central shaft is fixed and the direction of rotation is dictated by the direction of the magnetic fields the rotors can be configured to rotate in any direction without creating torque problems. Obviously direction of rotation affects fluid streams and the design of the diffusors and rotor blades.

Examples of rotor direction rotation configuration is shown in the tables:

(CW=clockwise; CCW=counter clockwise)

| First axial second radial outboard stage: | CCW/CW | Second axial second radial outboard stage: | CCW/CW |
|---|---|---|---|
| First axial inboard stage: | CW/CCW | Second axial inboard stage: | CW/CCW |

| CCW/CW | CW/CCW |
| CW/CCW | CCW/CW |

| CW/CCW | CCW/CW |
| CCW/CW | CW/CCW |

Sixth Embodiment of the Invention

Figure 5:
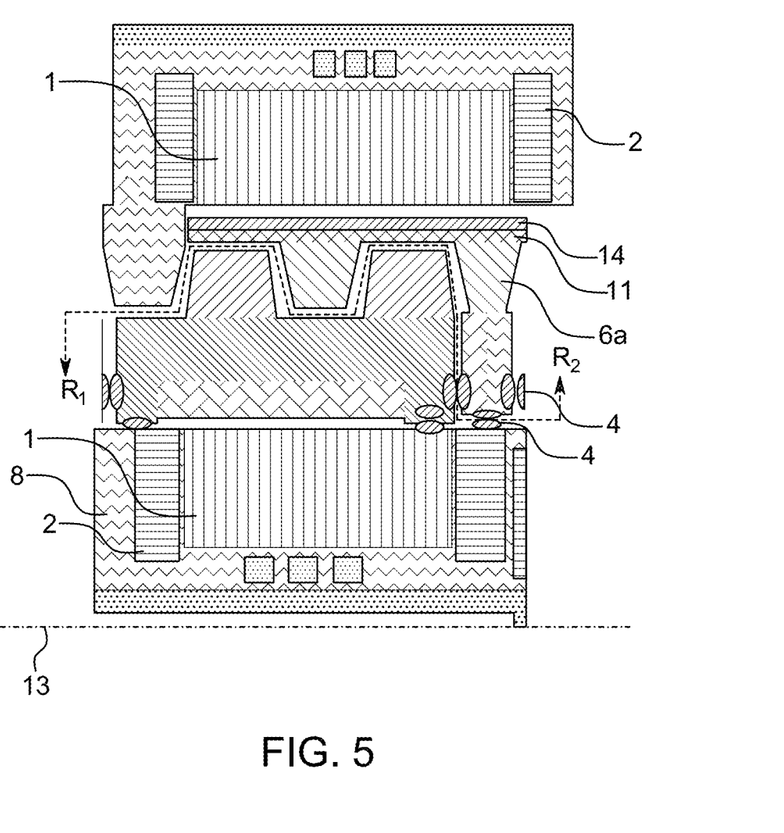
FIG. 5 shows a sectional view of a fourth embodiment of the modular pump according to the present invention.

Reference is made to FIG. 5, which shows a hybrid solution with a first inner stage, where the first inner stage comprises a central shaft with motor windings. A first rotor with a permanent magnet rotates about the central shaft, with the central axis of the central shaft as an axis of rotation. Two rows, R1 and R2 of impellers are fixed to the rotor. A second outer radial stage includes a second radially outer rotor rotating in an opposite direction of the first rotor. The second radially outer rotor includes two impellers, S1 and S2, which is arranged in between the impellers of the inner stage. Outside of the second rotor it is arranged a second outboard stator with motor windings.

The compressor or pump arrangement, the hybrid inboard outboard solution according to FIG. 5, also comprises radial bearings for the inboard first rotor and the second radially outer rotor and two axial thrust bearings per rotor. The central shaft can be provided with cooling canals, the same applies to the outboard stator of the second outer radial stage. A shroud may surround the outer diameter of the stators of the second outer radial stage.

Seventh Embodiment of the Invention

Figure 7:
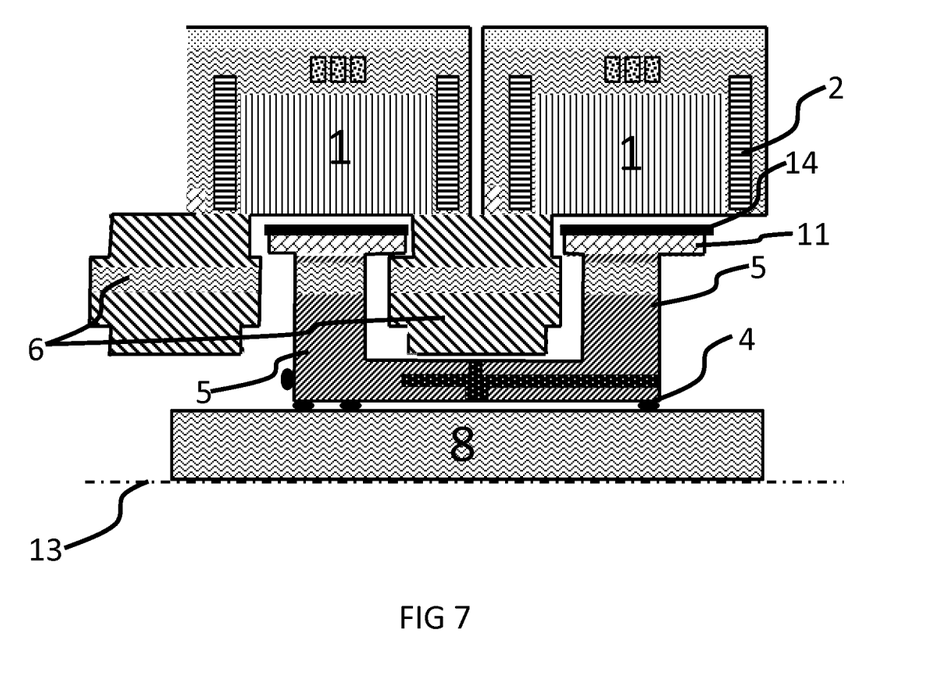

Reference is made to FIG. 7 where it is indicated that a pump or compressor includes two outboard stators adjacent each other provided with motor windings. Rotors are provided radially oriented between the outboard stators and a central shaft. The rotors can include an inner hollow axle, i.e. a pipe, which can rotate about the central shaft. On the inner hollow axle it is provided two or more axially separated impellers. The rotor arrangement can be seen as the hollow axle with a number of disc-shaped rotors attached thereto. The number of axially oriented rotors fixed to the same hollow axle is a matter of design. As this is an outboard arrangement magnets are arranged on an outer diameter of the rotors, outside of the magnets a retaining ring can be provided to keep the magnets on place when influenced by centrifugal forces. The magnets of the rotors magnetically interacts with one or more outboard stator. Diffusors are arranged between the impellers. The impellers can be fixed to the outboard stators. The diffusors protrudes inwards from the stators. According to this embodiment a single stage comprises one hollow axle adapted to rotate around a central fixed shaft, associated with at least two rotors and the necessary stators as indicated in FIG. 7 where a two rotor configuration is shown.

By mechanically connecting two or more rotors mechanically combined together with a rigid coupling the number of axial thrust bearing is reduced and two or more impellers are driven by the same variable speed driver.

The pump or compressor stage according to FIG. 7 may also comprise cooling mans, bearing raceways on the inner fixed shaft, radial bearings between central shaft and revolving hollow axle, axial thrust bearings. Obviously, within one stage the direction of rotation for the rotors are the same as they share the same hollow axle. Two axially adjacent stages may have contra rotating rotors.

Building Modules of Single Stages

A pump or compressor according to any of the embodiments of the present invention comprises at least one stage. A stage comprises at least a stator and a rotor with associated elements. In principle we can have inboard stages and outboard stages. Stages can be combined axially and or radially. A two stage module as shown in FIG. 2 can be extended into several axially oriented inboard modules. The same applies to the module shown in FIG. 3. FIG. 4 is a 4 stage module which can be combined with similar four stage modules. FIG. 5 is a hybrid module, the module scales axially well, i.e. can be combined axially with similar modules. The module of FIG. 6 shows two outboard stages, a plurality of such stages/modules can be axially/serially combined, the same applies to the module in FIG. 7.

The ratio between rows of impellers vs. number of rotors per stage between modules does not necessarily be the same for the configurations described with reference to FIG. 2-7.

Alternation of inboard and outboard motors enables to increase the axial length of the active part (laminations) for each electric motor and increase the overall power density.

The invention claimed is:

1. A compressor or pump arrangement comprising a number of compressor or pump stages arranged axially adjacent with each other
   a) where a first inner stage at least comprises a first inner central shaft and one first inner rotor configured to rotate in a first direction, where the axis of rotation of the first inner rotor is the first inner central shaft,
   b) first outer stage arranged radially outside of the first inner stage comprising a first outer rotor configured to rotate in a second direction, opposite the first direction, and where the axis of rotation of the first outer rotor is the first inner central shaft, and where each rotor at least is provided with a number n≥2 rows of impellers arranged at an inner perimeter of its associated rotor with an axial distance between neighbouring rows of impellers.

2. A compressor or pump arrangement according to claim 1, where at least a first inner motor winding is arranged adjacent to the first inner central shaft in the first inner stage, and a first outer motor winding is arranged adjacent to the first outer rotor.

3. A compressor or pump arrangement according to claim 1, where each compressor or pump stage at least comprises a stator and a rotor which together forms an electric motor,
   a) where a first inner stator being a part of a first inner motor at least comprises:
      i. the first inner central shaft with the first motor winding;
      ii. electric wiring for the first motor winding, and
      iii. cooling means
   and where the one first inner rotor with an axis of rotation about the central shaft being a part of a first inner motor, at least comprises:
      iv. a number, n, of rows of impellers axially arranged at an inner perimeter of the rotor, where n={2, 3, 4 ... } with an axial distance between the axially adjacent rows of impellers; and
      v. a permanent magnet arranged on the rotor in close proximity with the central shaft and in magnetic interaction with the motor windings defining a gap d1 between the permanent magnet and the motor windings, and
   where a first outer stator radially outside of a first outer rotor being a part of a first outer motor comprises:
      vi. first outer motor winding;
      vii. first outer electric wiring for the first outer motor windings, and
      viii. first outer cooling means
   and where the first outer rotor with an axis of rotation about the central shaft being a part of a first outer motor, at least comprises:
      ix. a number, n, of rows of impellers axially arranged at an inner perimeter of the first outer rotor, where n={1, 2, 3 ... } and if n≥2 with an axial distance between the axially adjacent rows of impellers; and
      x. a permanent first outer magnet arranged on the first outer rotor in close proximity with the first outer stator and in magnetic interaction with the first outer motor windings defining a gap d1 between the first outer permanent magnet and the first outer motor windings.

4. A compressor or pump arrangement according to claim 3 where the first inner motor further comprises two or more axial thrust bearings arranged between the first inner rotor and the central shaft and at least two first inner axial thrust bearings arranged axially remote from each other and being associated with the first inner rotor and the first outer motor further comprises at least one axial thrust bearing arranged between the first outer rotor and an annular bearing raceway where the annular bearing raceway is arranged axially adjacent with the first inner stator.

5. A compressor or pump arrangement according to claim 3 where each of the compressor or pump stages comprises at least, m, rows of diffusors arranged between the first outer stator and the first inner stator.

6. A compressor or pump arrangement according to claim 3, where the first outer stage comprises a first outer shroud surrounding the first outer stator.

7. A compressor or pump arrangement according to claim 1, further comprising:
   a second inner stage, arranged axially adjacent the first inner stage and comprising, the first inner central shaft and one second inner rotor, where the axis of rotation of the second inner rotor is the first inner central shaft; and
   a second outer stage, arranged radially outside of the second inner stage comprising a second outer rotor, and where the axis of rotation of the second outer rotor is the first inner central shaft, and where each rotor at least is provided with a number n≥2 rows of impellers arranged at an inner perimeter of its associated rotor with an axial distance between neighbouring rows of impellers.

8. A compressor or pump arrangement according to claim 7, where at least a second inner motor winding is arranged adjacent to the first inner central shaft in the second inner stage, and a second outer motor winding is arranged adjacent to the second outer rotor.

* * * * *